(12) United States Patent
Obase et al.

(10) Patent No.: US 8,276,171 B2
(45) Date of Patent: Sep. 25, 2012

(54) PICKUP FRAME AND OPTICAL PICKUP DEVICE

(75) Inventors: Satoshi Obase, Osaka (JP); Toshiaki Takasu, Osaka (JP); Hiroaki Suzuki, Osaka (JP)

(73) Assignee: Panasonic Corporation, Osaka (JP)

( * ) Notice: Subject to any disclaimer, the term of this patent is extended or adjusted under 35 U.S.C. 154(b) by 321 days.

(21) Appl. No.: 12/763,131

(22) Filed: Apr. 19, 2010

(65) Prior Publication Data

US 2010/0315930 A1    Dec. 16, 2010

(30) Foreign Application Priority Data

Apr. 21, 2009 (JP) ................................. 2009-102580

(51) Int. Cl.
*G11B 7/12* (2006.01)
*G11B 7/08* (2006.01)
(52) U.S. Cl. ........................ 720/676; 720/672
(58) Field of Classification Search .................. 720/658, 720/659, 663, 672, 676
See application file for complete search history.

(56) References Cited

U.S. PATENT DOCUMENTS

2008/0120632 A1 *  5/2008  Masui et al. .................. 720/675

FOREIGN PATENT DOCUMENTS

| JP | 2008-171498 | | 7/2008 |
| JP | 2009283112 A | * | 12/2009 |
| JP | 2009283113 A | * | 12/2009 |
| JP | 2009283114 A | * | 12/2009 |

* cited by examiner

*Primary Examiner* — Will J Klimowicz
(74) *Attorney, Agent, or Firm* — Renner, Otto, Boisselle & Sklar, LLP (57) ABSTRACT

In an optical pickup device 3, a supporting base 18 that has a main-shaft bearing 6a with two concentric round holes to pass a main shaft 7 through is formed out of a synthetic resin. On the other hand, an optical base 19, which has a sub-shaft bearing 6b to pass a sub-shaft 8 through and which supports a light emitter 11, a beam splitter 12, a collimator lens 13 and a photodetector 17, is formed by metal die casting process. And a pickup frame 6 is formed by bonding the supporting base 18 and the optical base 19 together with an adhesive.

7 Claims, 5 Drawing Sheets

PICKUP FRAME AND OPTICAL PICKUP DEVICE

BACKGROUND OF THE INVENTION

1. Field of the Invention

The present invention relates to a pickup frame made of a composite material including a synthetic resin and a metal, an optical pickup device including such a pickup frame, and an optical information recording/reproduction apparatus including such an optical pickup device.

2. Description of the Related Art

As a means for reading an information signal that is stored on an optical disc, which is being rotated by an optical disc drive, by irradiating the signal storage side of the disc with light or a means for writing information on the optical disc, an optical pickup device is built in a recording/reproduction apparatus.

Recently, an optical information recording/reproduction apparatus (or an optical drive) including such an optical pickup device is built in mobile personal computers (which are sometimes called "mobile PCs") more and more often. And the more popular such PCs have become, the handier they should come in. Specifically, their handiness is rated by their size (particularly their thickness) and their weight. That is to say, the smaller, thinner and lighter such a PC, the better. And an optical pickup device, which is one of essential components of an optical drive, is also required to meet those demands. On top of that, the optical pickup device also needs to have sufficiently high rigidity and rather high reliability under various harsh external environments, even though these requirements are contradictory to those downsizing trends. That is to say, the optical pickup device should maintain sufficient rigidity and operate with good stability even when exposed to a rather high or low temperature or high and low temperatures alternately a number of times. And the pickup frame, which is one of the main members of the optical pickup device, is a main factor that will determine its size and weight. That is why the following description will be focused on such a pickup frame.

The housing of popular optical drives built in mobile PCs often has a thickness (or height) of 12.7 mm or 9.5 mm.

An optical drive with a thickness of 12.7 mm adopts a pickup frame in which both of bearing portions arranged at both ends of an optical pickup device are often formed as integral parts of a single member by performing a metal die casting process. Meanwhile, some drives may adopt a pickup frame in which those portions are all formed out of a synthetic resin as respective parts of a single member. In those pickup frames, a light emitter and a photodetector are supported with a holder. And part of an optical element that changes the optical paths is also supported on such a pickup frame.

On the other hand, an optical drive with a thickness of 9.5 mm adopts a pickup frame in which both of bearing portions arranged at both ends of an optical pickup device are formed as respective parts of a single member by performing a die casting process on a metal such as aluminum or magnesium. In such a pickup frame, a light emitter and a photodetector are supported with a holder. And part of an optical element that changes the optical paths is also supported on such a pickup frame.

Also proposed is a pickup frame in which a supporting base, where both of bearing portions arranged at both ends of an optical pickup device are formed out of a synthetic resin as respective parts of a single member, and a metallic optical base that supports a light emitter, a photodetector and an optical element to change optical paths are bonded together with an adhesive (see Patent Document No. 1 (Japanese Patent Application Laid-Open Publication No. 2008-171498).

SUMMARY OF THE INVENTION

In the pickup frame in which the bearing portions arranged at both ends of the optical pickup device are both formed out of a synthetic resin as respective parts of a single member, the strength of the synthetic resin portions is not so high. That is why if the optical pickup device has a reduced thickness (e.g., in an optical drive with a thickness of 9.5 mm), it is difficult to maintain sufficiently high accuracy between the bearing portions at both ends of the optical pickup device due to the deformation or strain of the synthetic resin portions. In addition, due to such deformation or strain, it is also difficult to arrange accurately enough the light emitter, the photodetector and the optical element to change the optical paths (and to determine the relative position of that optical element) because these members need to be put in place and supported after having their positions adjusted with respect to those bearing portions at both ends. These problems arise when the optical element is attached to the pickup frame and when the optical pickup device is exposed to an external environment in which the temperature is very high, very low or alternates between such high and low temperatures a number of times.

The bearing portions at both ends of the optical pickup device need to pass two guide shafts, which are arranged parallel to each other to guide the optical pickup device that moves back and forth between the inner and outer edges of a given optical disc. Unless sufficient accuracy can be maintained between the bearing portions at both ends of the optical pickup device, the load between the optical pickup device and the guide shafts would increase, thus causing some trouble in the operation of the optical drive.

Furthermore, unless the light emitter, the photodetector and the optical element to change the optical paths can be arranged accurately enough or unless the relative sizes and positions of these optical elements can be determined accurately enough, the light beam spot formed on the optical disc would be deformed or the light reflected from the optical disc would be off target when received by the photodetector. As a result, the quality of the read/write signal would deteriorate and an error signal to control the optical pickup device would be disturbed, thus causing a serious problem in the read/write performance of the optical drive.

On top of that, if the optical pickup device with a reduced thickness were dropped by mistake, the impact applied to the optical pickup device would break the bearings (particularly U-bearings) that are formed out of a synthetic resin and their surrounding portions, which is also a problem.

In view of these problems, a pickup frame for use in optical drives with a thickness of 9.5 mm, in particular, is often formed as a single member by performing a die casting process on some metal such as aluminum or magnesium.

However, such a metal die-cast pickup frame (among other things, an aluminum or magnesium die-cast pickup frame that has a reduced weight) is less cost effective than a resin one. This is also a problem.

Likewise, even in a pickup frame for use in an optical drive with a thickness of 12.5 mm, both of the bearing portions arranged at both ends of the pickup device are not formed out of a synthetic resin but often formed as respective parts of a single member by performing a die casting process on zinc, aluminum, magnesium or any other suitable metal. The reason is that it is difficult to ensure strength that is high enough to make a pickup frame by forming the pickup frame out of only a synthetic resin. Recently, it has become harder and harder to ensure sufficient mechanical strength for the pickup frame for the following reasons. Specifically, as the number of different types of optical discs, including CDs, DVDs and Blu-ray Discs (BDs), has been increasing year after year, more and more light emitters and optical elements to change the optical paths need to arranged within a narrow pickup frame. Consequently, it has become increasingly difficult to set the volume (or shape) of the pickup frame great enough to ensure sufficiently high strength for the pickup frame.

Another important problem with an optical pickup device is that the heat generated by a laser diode and by a laser drive IC that drives the laser diode needs to be dissipated as efficiently as possible. Recently, the higher the writing speed, the higher the optical power of the laser beam emitted and the greater the quantity of heat generated tend to be. And to dissipate such a quantity of heat efficiently, a metallic pickup frame is preferred to a resin one.

It is therefore an object of the present invention to overcome those problems to be inevitably caused in a pickup frame for an optical pickup device to be built in an optical drive for a mobile PC, for example, as the size (particularly the thickness) and weight of the optical pickup device are reduced to meet the recent downsizing trend.

A frame according to the present invention is designed to be used in an optical pickup device. The frame includes a first base, which has been formed out of a metal, and a second base, which has been formed out of a resin and which is secured to the first base. The frame is arranged between a first shaft portion and a second shaft portion, which runs substantially parallel to the first shaft portion, and is movable parallel to the first shaft portion while being engaged with the first and second shaft portions. The first base includes: an optical element supporting portion for supporting optical elements for emitting a laser beam toward an optical recording medium and receiving light that has been reflected from the optical recording medium; and a first shaft bearing portion to engage with the first shaft portion. The second base includes a second shaft bearing portion to engage with the second shaft portion.

In one preferred embodiment, one of the first and second shaft bearing portions has a hole to pass its associated shaft portion through, and the other shaft bearing portion includes a restricting portion for restricting vertical movement of the frame by vertically gripping its associated shaft portion.

In another preferred embodiment, the first shaft bearing portion includes a restricting portion for restricting vertical movement of the frame by vertically gripping the first shaft portion. And the second shaft bearing portion has a hole to pass the second shaft portion through.

In still another preferred embodiment, the first and second bases are bonded together with an adhesive.

In yet another preferred embodiment, the first base includes a mirror supporting portion for supporting a high-reflecting mirror that reflects an emitted laser beam perpendicularly to the surface of the optical recording medium.

In yet another preferred embodiment, the second base includes a mirror supporting portion for supporting a high-reflecting mirror that reflects an emitted laser beam perpendicularly to the surface of the optical recording medium.

An optical pickup device according to the present invention includes a frame according to any of the preferred embodiments of the present invention described above, a light emitter for emitting a laser beam, and an optical system for guiding the laser beam emitted toward the optical recording medium.

Another frame according to the present invention is also designed to be used in an optical pickup device. The frame is arranged between a first shaft portion and a second shaft portion, which runs substantially parallel to the first shaft portion, and is movable parallel to the first shaft portion while being engaged with the first and second shaft portions. The frame includes a base, which has been formed out of a resin, and a first shaft bearing portion, which has been formed out of a metal to engage with the first shaft portion. The base includes an optical element supporting portion for supporting optical elements for emitting a laser beam toward an optical recording medium and receiving light that has been reflected from the optical recording medium, and a second shaft bearing portion to engage with the second shaft portion.

Still another frame according to the present invention is also designed to be used in an optical pickup device. The frame is arranged between a first shaft portion and a second shaft portion, which runs substantially parallel to the first shaft portion, and is movable parallel to the first shaft portion while being engaged with the first and second shaft portions. The frame includes a base, which has been formed out of a resin. The base includes: an optical element supporting portion for supporting optical elements for emitting a laser beam toward an optical recording medium and receiving light that has been reflected from the optical recording medium; a bearing portion to engage with the second shaft portion; and a contact portion to contact with the first shaft portion. The frame includes a metallic restricting portion for restricting vertical movement of the frame by gripping, along with the contact portion, the first shaft portion vertically.

In one preferred embodiment, the metallic restricting portion is plate metal.

In another preferred embodiment, the metallic restricting portion is screwed to the frame.

A pickup frame according to the present invention is used in an optical pickup device that gets a light beam, which has been emitted from a light emitter, reflected by a high-reflecting mirror perpendicularly to the surface of a recording medium (such as an optical disc) to irradiate the optical disc with the light beam and then gets the light that has been reflected from the optical disc received by a photodetector. The pickup frame includes a metallic optical base for supporting the light emitter and the photodetector and a synthetic resin supporting base, which has been combined together with the optical base. Two shaft bearing portions are arranged at both ends of the pickup frame. The second shaft bearing portion has been formed as an integral part of the supporting base, while the first shaft bearing portion has been formed as an integral part of the optical base.

As a result, a pickup frame, which can ensure the strength that the bearing portions need to have, is realized at a reduced cost. On top of that, the heat generated by the light emitter can also be dissipated efficiently into the metallic optical base.

In one preferred embodiment of the present invention, the second shaft bearing portion has two round holes that are concentric with each other. In that case, even if the second shaft bearing portion is formed out of a synthetic resin, the bearing portion can still have a shape that realizes the required strength.

In another preferred embodiment of the present invention, the first shaft bearing portion has a U-cross section, which opens opposite from the center of the pickup frame (i.e., faces outward). Such a first shaft bearing portion has a simple shape and can have a smaller bearing size. However, as such a U-shape would not realize so high strength, the first shaft bearing portion is made of a metal to achieve the strength required.

In still another preferred embodiment of the present invention, the optical base and the supporting base are bonded together with an adhesive. If these bases were formed by insert molding or outsert molding process, either the optical base or the supporting base (or particularly the supporting base made of a synthetic resin) would have some residual strain. However, if these bases are bonded together with an adhesive, the occurrence of such a residual strain can be avoided.

In yet another preferred embodiment of the present invention, the supporting base includes a high-reflecting mirror supporting portion. If the supporting base is designed to have a surface to support the high-reflecting mirror, the supporting base will have an angled shape and will have its strength further increased.

In an alternative preferred embodiment of the present invention, the optical base has a surface for supporting the high-reflecting mirror. As a result, the deviation in relative size and relative position between optical elements to be supported by the pickup frame can be reduced to an even lower level.

Also, according to the present invention, one of the two bearing portions arranged at both ends of an optical pickup device is provided by the synthetic resin supporting base, while the other shaft bearing portion is provided by the metallic optical base. And a pickup frame is formed by combining those supporting and optical bases together. As a result, even if the thickness or weight of the pickup frame is reduced, the accuracy between the bearing portions at both ends will not deteriorate due to the deformation or warp of the pickup frame. On top of that, even if the optical pickup device is dropped by mistake, it is still possible to prevent the impact caused in such a situation from breaking the bearing portions and its surrounding portions. What is more, the heat generated by the laser diode can also be dissipated into the optical base, thus preventing the laser diode from breaking down under the heat. Furthermore, in a conventional optical pickup device with a reduced thickness, the pickup frame with bearing portions at both ends needs to be formed out of only a metallic material, thus raising the cost significantly. According to the present invention, however, such a problem can be overcome with the cost cut down significantly.

DETAILED DESCRIPTION OF PREFERRED EMBODIMENTS (Embodiment 1)

Figure 1:
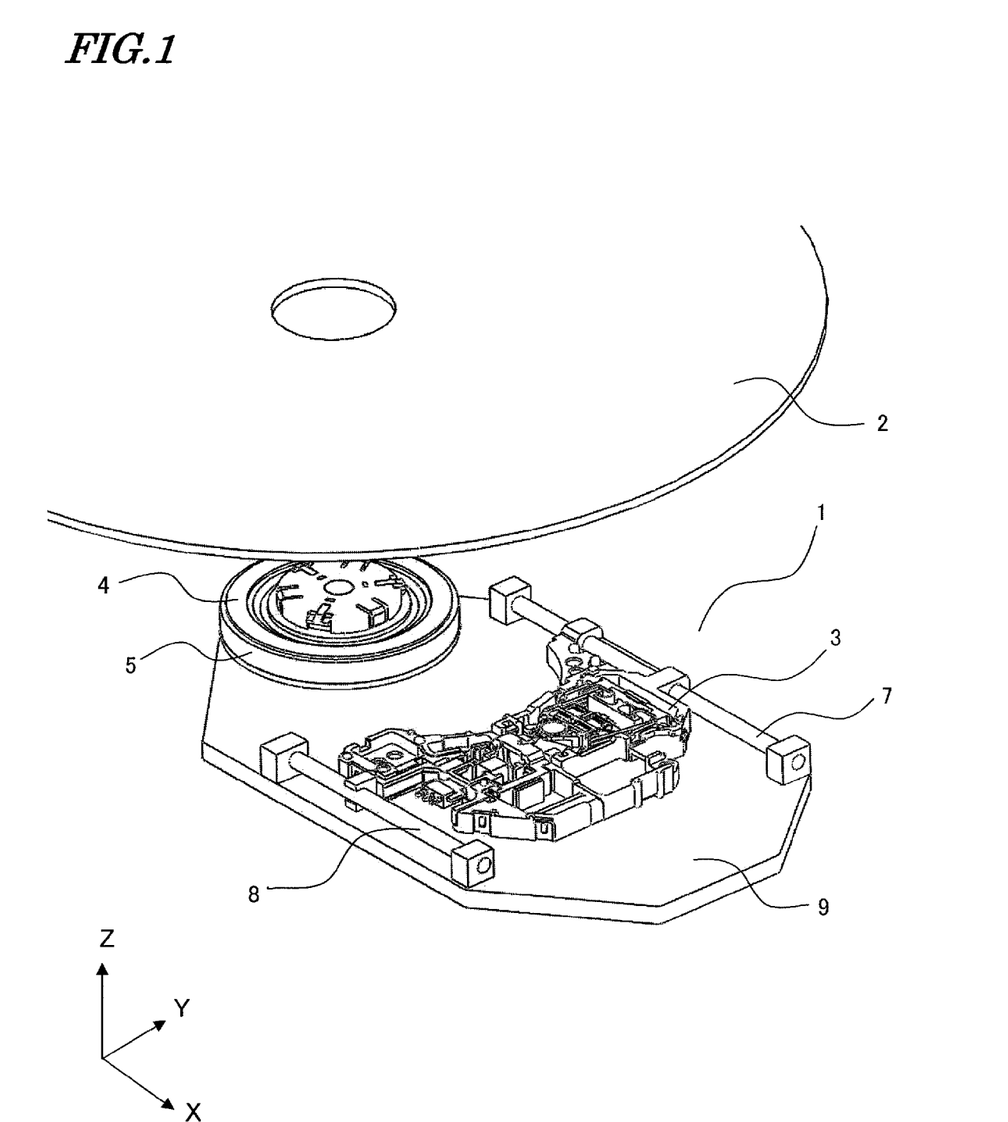
FIG. 1 is a perspective view illustrating an optical information recording/reproduction apparatus according to a first preferred embodiment of the present invention.

Hereinafter, an Optical Information recording/reproduction apparatus as a first specific preferred embodiment of the present invention (which will be referred to herein as an "optical drive") will be described with reference to FIG. 1, which is a perspective view illustrating the optical drive of the first preferred embodiment. To make the features of this preferred embodiment easily understandable, each of the attached drawings illustrates the drive with some of its elements omitted. In the following description, the direction in which the optical pickup device 3 shown in FIG. 1 moves from under some inner radial location on an optical disc 2 toward its outer edge will be referred to herein as an "X-axis direction", the direction that intersects with the X-axis direction at right angles and that is parallel to the surface of the optical disc 2 will be referred to herein as a "Y-axis direction", and the direction that intersects with both of the X- and Y-axis directions will be referred to herein as a "Z-axis direction". In FIG. 1, the positive X-axis direction is indicated by the diagonally downward and rightward arrow, the positive Y-axis direction is indicated by the diagonally upward and rightward arrow, and the positive Z-axis direction is indicated by the upward arrow.

As shown in FIG. 1, the optical drive 1 includes a turntable 4 to mount an optical disc 2 (which is an example of recording media) thereon in a rotatable position, a spindle motor 5 for turning the optical disc 2 on the turntable 4, an optical pickup device 3 for reading and writing information from/on the optical disc 2, a main shaft 7 and a sub-shaft 8 for guiding the optical pickup device 3 with respect to the optical disc 2, and a drive mechanism (not shown) for moving the optical pickup device 3.

The drive mechanism includes, as its main members, the main and sub-shafts 7 and 8, which are arranged parallel to each other to move the optical pickup device 3, and a supporting stage 9 with a motor (not shown) for driving the main shaft 7. The main shaft 7 is arranged on the supporting stage 9 to run in the X-axis direction and has a screwed portion (not shown) to get screwed into the pickup frame 6 of the optical pickup device 3 (see FIG. 2). As the main shaft 7 is driven, the optical pickup device 3 moves in the X-axis direction, which is parallel to the radial direction of the optical disc 2. The main shaft 7 also has the function of preventing the pickup frame 6 from moving in any direction other than the X-axis direction. On the other hand, the sub-shaft 8 not only prevents the pickup frame 6 from turning on the main shaft 7 but also supports the pickup frame 6 so that the pickup frame 6 is movable in the X-axis direction. The optical pickup device 3 moves along the main shaft 7. As a result, the optical pickup device 3 can move both toward the outer edge of the optical disc 2 (i.e., in the positive X-axis direction) and toward the inner edge thereof (i.e., in the negative X-axis direction). It should be noted that any other mechanism may also be used to drive the optical pickup device 3 with respect to the optical disc 2.

Structure of Optical Pickup Device

Figure 2:
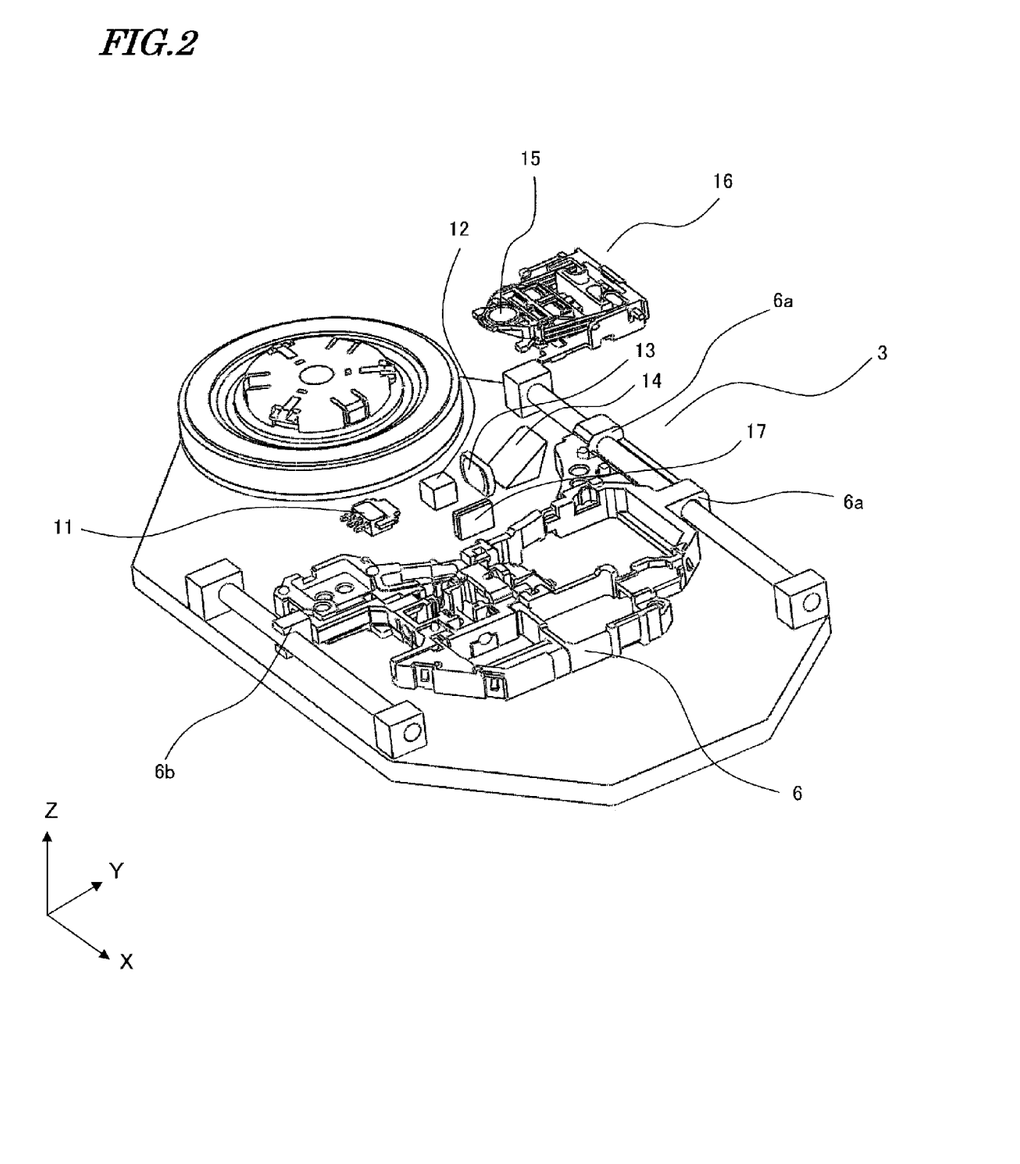
FIG. 2 is a perspective view illustrating an optical pickup device according to the first preferred embodiment.

Hereinafter, the optical pickup device 3 of this first preferred embodiment will be described in detail with reference to FIG. 2, which is a perspective view illustrating the optical pickup device 3 of the first preferred embodiment. In FIG. 2, to simplify the description, only essential members that must be illustrated to describe the present invention are shown and the illustration of other members, including a flexible pattern for transmitting an electrical signal, plate metal for housing that pattern in the optical pickup device, and some optical elements such as lenses, is omitted.

As shown in FIG. 2, the optical pickup device 3 includes a pickup frame 6 as a combination of a metallic member and a synthetic resin member, a light emitter 11 for emitting a laser beam, a beam splitter 12 for transmitting the laser beam emitted from the light emitter 11 and reflecting the returning laser beam, which has been reflected from the optical disc 2, toward a photodetector 17, a collimator lens 13 for transforming the light emitted from the light emitter into a parallel light beam, a high-reflecting mirror 14 for changing the optical paths of the incoming light so that the light goes perpendicularly to the surface of the optical disc 2, an objective lens 15 for condensing the light toward the information recording layer of the optical disc 2, the photodetector 17 for detecting the returning laser beam that has been reflected from the optical disc 2 and converting the laser beam into current, and an objective lens driver 16 for driving the objective lens 15 in a focus direction (i.e., in the Z-axis direction) and in a tracking direction (i.e., in the X-axis direction) with respect to the optical disc 2. It should be noted that the optical members that are actually supported on the pickup frame 6 but are not shown in FIG. 2 include a grating arranged between the light emitter and the beam splitter, a wave plate arranged between the beam splitter and the high-reflecting mirror, and a detector lens arranged between the photodetector and the beam splitter.

At one of the two ends of the pickup frame 6 in the Y-axis direction, arranged is a main-shaft bearing 6a that prevents the pickup frame 6 from moving in any direction other than the X-axis direction. At the other end of the pickup frame 6, arranged is a sub-shaft bearing 6b that prevents the pickup frame 6 from turning on the main shaft 7 that runs in the X-axis direction.

Structure of Pickup Frame

Hereinafter, the optical pickup device 3 of this first preferred embodiment will be described in further detail with reference to FIG. 3, which is a perspective view illustrating the structure of the pickup frame 6 along with optical elements to be attached to the pickup frame 6 as in FIG. 2.

Figure 3:
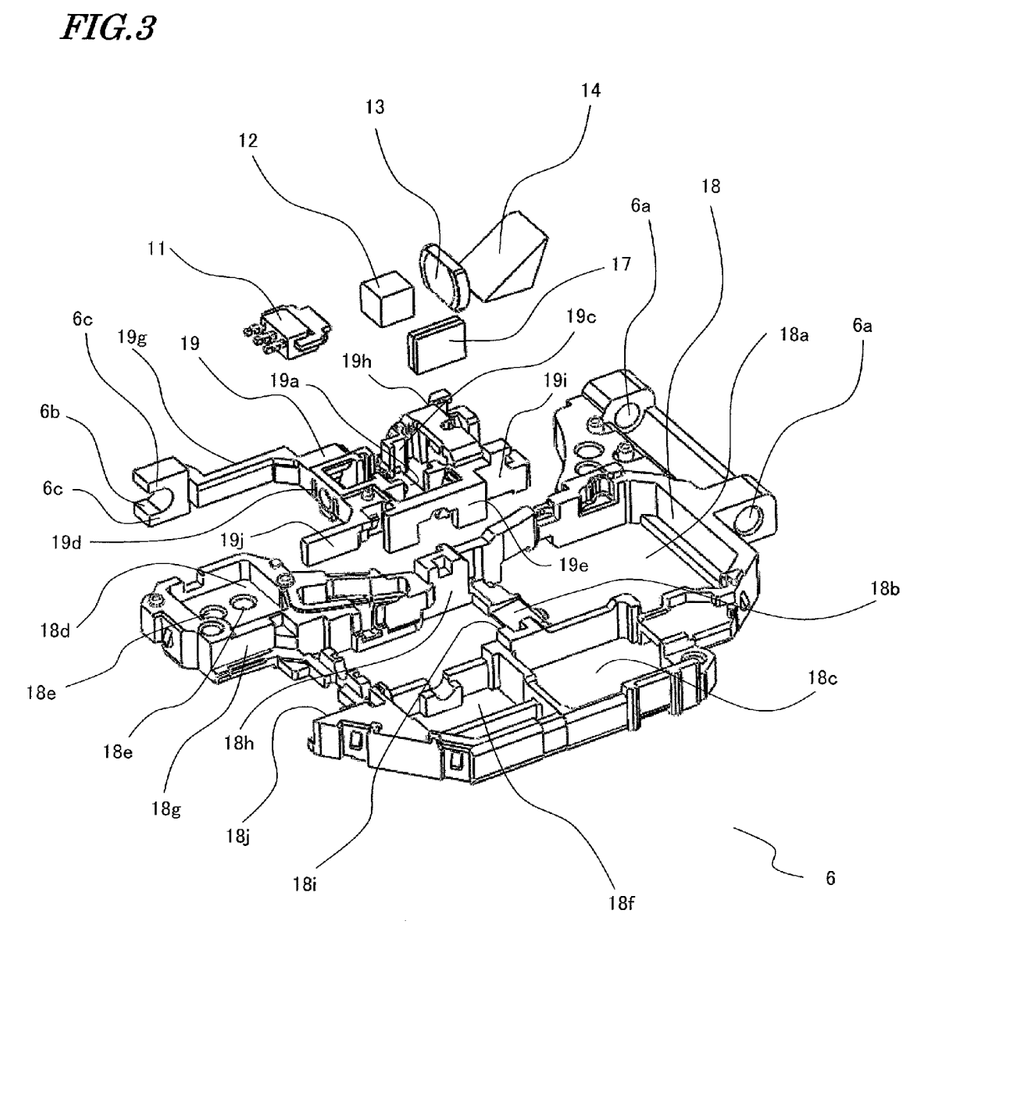
FIG. 3 is a perspective view illustrating the structure of a pickup frame according to the first preferred embodiment along with optical elements to be assembled on the frame.

As shown in FIG. 3, the pickup frame 6 includes a supporting base 18 to support the objective lens driver 16 (see FIG. 2) and the high-reflecting mirror 14 and an optical base 19 to support the light emitter 11, the beam splitter 12, the collimator lens 13 and the photodetector 17. Also mounted on the optical base 19 is an optical system for guiding the emitted laser beam to the optical disc.

The objective lens driver 16 is housed inside an opening 18a of the supporting base 18 with a gap left and is supported with an adhesive that fills that gap. On the other hand, the high-reflecting mirror 14 is bonded to the high-reflecting mirror supporting surface 18b of the supporting base 18 with an adhesive that has been applied to that surface 18b so that the mirror 14 makes close contact with the surface 18b.

The beam splitter 12 and the collimator lens 13 are respectively bonded to the beam splitter supporting surface 19a and the collimator lens supporting surface 19c of the optical base 19 with either an adhesive that has been applied to those surfaces 19a and 19c or their surrounding adhesive so that these members 12 and 13 make close contact with their respective surfaces 19a and 19c. The light emitter 11 is inserted into a holder (not shown) separately provided and then is bonded to the light emitter supporting surface 19d of the optical base 19 with an adhesive that has been applied to that surface 19d so that the emitter 11 makes close contact with the surface 19d. And the photodetector 17 is inserted into a holder (not shown) separately provided, housed inside a photodetector supporting surface 19e of the optical base 19 with a gap left and is supported with an adhesive that fills that gap.

In this first preferred embodiment, the light emitter 11 is a single element that emits light beams with multiple different wavelengths and the photodetector 17 is also a single element that receives their reflected light beams with those different wavelengths. Optionally, the light emitter may include a number of light emitters with multiple different wavelengths, which are inserted into a holder and then supported on the optical base 19 just as described above. The same can be said about the photodetector, too. That is to say, the photodetector may include a number of photodetectors with multiple different wavelengths, which are inserted into a holder and then supported on the optical base 19 just as described above.

Also, at one end of the supporting base 18 that defines a first end in the Y-axis direction (i.e., at the upper right end in FIG. 3), arranged is a main-shaft bearing 6a with two concentric round holes to pass the main shaft 7 (see FIG. 1). On the other hand, at one end of the optical base 19 that defines a second end in the Y-axis direction (i.e., at the lower left end in FIG. 3), arranged is a sub-shaft bearing 6b with a U-cross section and with an opening facing that second end in the Y-axis direction to pass the sub-shaft 8 (see FIG. 1) through the U-cross section. The sub-shaft bearing 6b vertically grips the sub-shaft 8, thereby functioning as a restricting portion that restricts the vertical movement of the frame. As used herein, the "vertical direction" refers to the Z-axis direction, i.e., perpendicular to the respective surfaces of the optical disc 2 and the supporting stage 9.

The main-shaft bearing 6a engages with the main shaft 7 while the sub-shaft bearing 6b engages with the sub-shaft 8. The frame 6 is arranged between the main and sub-shafts 7 and 8 that run substantially parallel to each other so as to move in the longitudinal direction of the shafts 7 and 8 while being engaged with the shafts 7 and 8.

The supporting base 18 may be made of a synthetic resin including polyphenylene sulfide (PPS) or liquid crystal polymer (LCP) resin as a main ingredient and has relatively low mechanical strength. But the supporting base 18 can have a lighter weight, and can be more cost effective, than a metal die-cast one.

Further provided in the supporting base 18 are a space 18c to house a laser driver IC, a space 18d to house a laser output adjusting volume, its adjustment holes 18e, and a space 18f for a chucking mechanism that receives a photodetector (17) holder in order to adjust its position. Since all of these members should be supported, it would be difficult for a pickup frame made entirely of a synthetic resin to achieve sufficiently high mechanical strength.

The optical base 19 is obtained by performing a die casting process on a metal such as zinc, magnesium or aluminum as a main ingredient, and achieves not only good thermal conductivity but also high mechanical strength as well.

Suppose the pickup frame is an entirely metal die-cast one. In that case, a zinc die-cast frame will be relatively inexpensive among various metal die-cast frames. However, the zinc die-cast frame would have too heavy a specific gravity to be applied to the optical pickup device 3 (see FIG. 1) that should have as light a weight as possible to find application in mobile PCs. On the other hand, if a magnesium or aluminum die-cast frame that has a relatively low specific gravity is used, an increased cost would be an issue.

The supporting base 18 and the optical base 19 are combined together by filling very narrow gaps between them with an adhesive. As shown in FIG. 3, the gaps between the bonding surfaces 18g, 18h, 18i and 18j of the supporting base and the bonding surfaces 19g, 19h, 19i and 19j of the optical base 19 are filled with an adhesive and bonded together. Optionally, the optical base 18 and the supporting base 19 could also be welded together.

Effects Achieved by Embodiment 1

As described above, the supporting base 18, including the main-shaft bearing 6a, the opening 18a to house the objective lens driver 16, the high-reflecting mirror (14) supporting surface 18*b*, and the bonding surfaces 18*g*, 18*h*, 18*i* and 18*j* with respect to the optical base 19, is formed out of a synthetic resin because these members would achieve the minimum required mechanical strength even when made of a synthetic resin. As for members that would achieve only low mechanical strength when made of a synthetic resin, on the other hand, the optical base 19 to support such members including the sub-shaft bearing 6*b* with a U-cross section, the light emitter (11), beam splitter (12), collimator lens (13) and photodetector (17) supporting surfaces, and the bonding surfaces 19*g*, 19*h*, 19*i* and 19*j* with respect to the supporting base 18, is formed by metal die casting process. And the pickup frame 6 is formed by combining the supporting base 18 and the optical base 19 together with an adhesive. Hereinafter, the effects achieved by the optical pickup device 3 of this first preferred embodiment will be described as the following items (A) through (D):

(A) In this optical pickup device 3, some portions including the sub-shaft bearing 6*b* are metal die-cast ones. As a result, even when the thickness of the optical pickup device 3 is reduced, much higher mechanical strength can be ensured for the members to be arranged between the main- and sub-shaft bearings 6*a* and 6*b*, the sub-shaft bearing 6*b* itself, and members surrounding the sub-shaft bearing 6 compared to a pickup frame made entirely of a synthetic resin. Since this criterion is met, the optical pickup device 3 can be attached safely to the optical drive 1.

(A-1) More specifically, even when its thickness is reduced, the pickup frame 6 will still achieve a sufficient mechanical strength. As a result, optical elements can be attached to such a frame 6 with good angular accuracy achieved constantly, and therefore, optical pickup devices can be mass-produced at a good yield.

In particular, when the light emitter 11 (or its holder), the beam splitter 12, the collimator lens 13 and the high-reflecting mirror 14 are attached to the pickup frame 6, those members are brought into close contact with their respective supporting surfaces 19*d*, 19*a*, 19*c* and 18*b* of the pickup frame 6. In that case, not little pressure should be applied to the pickup frame 6 to make those members contact with the frame 6 so closely. That is why if the pickup frame were made only of a synthetic resin and would not achieve the minimum required mechanical strength as the thickness of the pickup frame is reduced, then the pickup frame would be deformed. In such a situation, the respective optical elements could not be attached to the pickup frame including the main- and sub-shaft bearings with sufficient angular accuracy achieved constantly. On the other hand, according to the present invention, supposing the pickup frame 6 that connects together the main-shaft bearing 6*a* at one end thereof and the sub-shaft bearing 6*b* at the other end is a single beam so to speak, a metallic optical base 19 is used as a part of that beam, thereby achieving the minimum required mechanical strength and eliminating the instability of the angular accuracy when those optical elements are attached to the frame.

(A-2) On top of that, even if the optical pickup device 3 including a pickup frame 6 with a reduced thickness were dropped by mistake, the impact applied to the optical pickup device 3 in such a situation would not break the sub-shaft bearing 6 and its surrounding members.

When a mobile PC with a built-in optical drive, for example, is dropped by mistake, the optical pickup device is sometimes subjected to a lot of impact. Suppose, as a comparative example, a pickup frame in which a sub-shaft bearing forms an integral part of a synthetic resin supporting base with a main-shaft bearing. In such a comparative example, a metal die-cast optical base, which supports a light emitter, a beam splitter, a collimator lens, a photodetector and other optical elements, and such a supporting base are bonded together with an adhesive. The effect of this first preferred embodiment will be described with this comparative example compared to the pickup frame of the first preferred embodiment.

If the thickness of the pickup frame of that comparative example is reduced to a certain degree, the sub-shaft bearing will achieve just low mechanical strength. For example, in an optical drive with a thickness of 9.5 mm, the boss to be a contact surface of the sub-shaft bearing will have a thickness of only about 0.8 mm on one of the two legs of its U-cross section. On top of that, between the main- and sub-shaft bearings, there is a metal die-cast optical base having a heavy specific gravity and loaded with a lot of optical elements. That is why if such a pickup frame were subjected to the impact produced when the optical pickup device is dropped by mistake, that impact will be applied as a moment from the metal die-cast portion to the sub-shaft bearing. Consequently, when the optical drive is dropped by mistake, the boss at the sub-shaft bearing will be easily broken (or chipped off). Or according to the dropping direction, the resin portion surrounding the sub-shaft bearing may produce a crack or deformed in any other way.

On the other hand, in the pickup frame 6 of this preferred embodiment, the sub-shaft bearing 6*b* is a metal die-cast one with high mechanical strength, and therefore, the boss 6*c* of the sub-shaft bearing 6*b* will not be broken. On top of that, the bonding surfaces 18*g* and 19*g* on the supporting base and optical base are both broad enough to disperse the impact applied to the bonding surface (or adhesive) when the optical drive is dropped by mistake. As a result, it is also possible to prevent the portions surrounding the sub-shaft bearing from getting damaged.

Hereinafter, other effects achieved by this preferred embodiment of the present invention will be described.

(B) Even when the optical pickup device 3 with a reduced thickness is exposed to a harsh external environment that has a very high temperature or a very low temperature or that alternates between the very high and very low temperatures a number of times, sufficiently high relative size accuracy can still be achieved between the main- and sub-shaft bearings 6*a* and 6*b* and between the optical elements supported by the pickup frame 6.

(B-1) Such an effect achieved by this preferred embodiment of the present invention will be described in further detail. First of all, even when the optical pickup device 3 is exposed to a harsh external environment that has a very high temperature or a very low temperature or that alternates between the very high and very low temperatures a number of times, sufficiently high relative size accuracy can be achieved between the main- and sub-shaft bearings 6*a* and 6*b*.

Suppose the pickup frame is made entirely of a synthetic resin. Or suppose at least the main- and sub-shaft bearings thereof are both formed out of a synthetic resin as in the comparative example described above. In each of these situations, when the internal strain accumulated in the synthetic resin portions during an injection molding process is spread at a time due to a change in the temperatures of the external environment, the relative size accuracy between the main- and sub-shaft bearings will decrease due to an insufficient mechanical strength of the synthetic resin portions. In that case, according to the relation between the main- and sub-shaft bearings and the guide shaft, the dynamic load of the optical pickup frame would increase, thus causing some trouble in the operation of the optical drive.

However, according to the present invention, the sub-shaft bearing 6b forms an integral part of the metallic optical base 19, and such a structure will also contribute to compensating for the lack of the mechanical strength of the synthetic resin supporting base 18. That is why even when subjected to a steep change of temperatures of the external environment, sufficiently high relative size accuracy can still be achieved between the main- and sub-shaft bearings. As a result, such a problem can be avoided effectively.

(B-2) On top of that, even when the optical pickup device 3 including a pickup frame 6 with a reduced thickness is exposed to a harsh external environment that has a very high temperature or a very low temperature or that alternates between the very high and very low temperatures a number of times, sufficiently high relative size accuracy can still be achieved between the light emitter 11, the beam splitter 12, the collimator lens 13, the photodetector 17 and other optical elements supported on the optical base 19.

If the pickup frame is made entirely of a synthetic resin, then it will be difficult to maintain sufficiently high relative size accuracy not only between the main- and sub-shaft bearings as described above but also between those optical elements as well. Such a relative size deviation between the optical elements to be a problem in an optical pickup device may be on the order of several ten micrometers between the light emitter and the photodetector, for example. In a situation where the pickup frame is made entirely of a synthetic resin, when the internal strain accumulated in the synthetic resin portions during an injection molding process is spread at a time due to a change in the temperatures of the external environment, the optical element supporting portions will also be deformed or warped quite a little due to the lack of the mechanical strength of the pickup frame. As a result, the adhesive that bonds the optical elements to the pickup frame will also be displaced to eventually cause a deviation of several ten micrometers, which is a serious problem.

In the pickup frame 6 of this preferred embodiment, the optical base 19 is a metal die-cast one, which has a higher mechanical strength than a synthetic resin frame. As for the internal strain accumulated during the injection molding process, various techniques for removing such an internal strain have already been developed and prepared for the metal die-cast frame. For example, the strain can be dissipated by subjecting the frame to a heat treatment process after the injection molding process. What is more, even if the metal die-cast frame is exposed to a harsh external environment that has a very high temperature, a very low temperature or very high and very low temperatures alternately, the optical base 19 will be hardly deformed or warped, and therefore, sufficiently high relative size accuracy can be maintained between the light emitter 11, beam splitter 12, collimator lens 13 and photodetector 17 supported on the base 19. As a result, the light beam spot on the optical disc 2 will not be deformed, the light reflected from the optical disc 2 will not deviate significantly off target on the photodetector 17, the quality of the read/write signal will never deteriorate, and an error signal to control the optical pickup device 3 will not be disturbed, either. Consequently, an optical pickup device 3 that can withstand such a steep change of temperatures of the external environment is realized.

To realize such an optical pickup device 3 that can withstand the steep change of temperatures of the external environment, a pickup frame may also be formed by bonding the optical base 19 and the supporting base 18 together with an adhesive.

The optical base 19 and the supporting base 18 could be combined together by some integral molding process such as an insert molding process or an outsert molding process. In that case, however, residual strain is particularly likely to remain in the synthetic resin supporting base and it is difficult to realize such an optical pickup device 3 that can withstand the steep change of temperatures of the external environment.

Furthermore, according to this preferred embodiment, as the photodetector 17 is once inserted into a holder and then attached to the optical base 19 with their gap filled with an adhesive, the supporting base 18 and the optical base 19 are also bonded together with an adhesive. Compared to the thermal strain to be caused in the optical base and the supporting base themselves until the molten resin cures in a situation where the supporting base and the optical base are formed by some integral molding process such as insert molding or outsert molding, the strain caused by curing of the adhesive is just minimal. That is why almost no residual strain should remain in the supporting base 18 or the optical base 19, and therefore, the effect (B) described above can be achieved.

(C) Another effect achieved by this preferred embodiment is that the heat generated by the light emitter 11 can be dissipated efficiently into the optical base 19 and the sub-shaft 8 because the sub-shaft bearing 6b, as well as the optical base 19 that supports the light emitter 11, is a metal die-cast one.

While information is being written on the optical disc 2, the optical power of the light emitter 11 increases, so does the quantity of heat generated there. The light emitter 11 has an upper limit temperature at or under which it can operate properly. That is why if the temperature of the light emitter 11 itself reaches 90° C. or more, for example, the light emitter 11 may no longer capable of providing optical power that is high enough to get writing done as intended. And if the temperature of the light emitter 11 further rose, the light emitter 11 itself would produce a thermal runaway or be broken down. As a result, the optical pickup device 3 could not get the write operation done or would be harmed.

If the pickup frame is made entirely of a synthetic resin, some measures are taken to dissipate that heat as efficiently as possible. For example, a metal die-cast member is used as the holder to hold the light emitter and has its volume increased.

According to the present invention, the metal die-cast optical base 19 has a sufficiently large volume and the sub-shaft bearing 6b also forms an integral part of the optical base, and therefore, the heat can be dissipated into the sub-shaft 8, which is made of a metal in almost all cases. By minimizing the rise in the temperature of the light emitter 11 itself in this manner, the optical pickup device 3 can be guaranteed to operate with good stability and never be harmed.

(D) Still another effect achieved by this preferred embodiment is that the optical pickup device 3 can have its thickness and weight both reduced and that an inexpensive pickup frame 6 is realized.

The same effects as the ones (A), (B) and (C) of this preferred embodiment are also achieved by forming the pickup frame by aluminum, magnesium or zinc die casting process. However, a zinc die-cast pickup frame has a relatively heavy specific gravity of approximately 6.7 compared to those of a synthetic resin frame, a magnesium die-cast frame, and an aluminum die-cast frame, which are about 1.4, about 1.8 and about 2.7, respectively, and therefore, cannot be used effectively in an optical pickup device for a mobile PC.

Also, the aluminum or magnesium die-cast pickup frame requires four or five times as high a cost as the synthetic resin pickup frame. And if the entire pickup frame is formed out of a synthetic resin, the problems described above should arise due to the lack of mechanical strength.

According to the present invention, the supporting base 18 is formed out of a synthetic resin, the optical base 19 is formed by metal die casting process, and then those bases are combined together to form a pickup frame. For that reason, compared to an optical pickup device, of which the pickup frame is formed entirely by metal die-casting process, the pickup frame of this preferred embodiment can have an even lighter weight while maintaining the required mechanical strength.

A pickup frame formed only by metal die-casting process requires a raised cost not only because the material itself is expensive in the first place but also because a high-precision die is needed to make such a frame. Since the injection molding process need to be carried out under strict conditions to achieve the required size accuracy, only one pickup frame product can be obtained from the die every time the injection molding process is performed. On top of that, as the injection molding process is repeatedly carried out a number of times, the die needs to be subjected to maintenance every now and then to maintain the required size accuracy. The size accuracy of the pickup frame can be ensured and maintained only under strict conditions because the relative sizes and positions needs to be determined accurately not just between the main- and sub-shaft bearings at both ends of the pickup frame but also between the optical element supporting surface and the main- and sub-shaft bearings.

In the pickup frame formed only by metal die-casting process, the relative sizes and positions need to be determined under most strict conditions between a portion of such a metal die-cast frame corresponding to the optical base of this preferred embodiment and the main-shaft bearing 6a. This is because there is an opening to house the objective lens driver between them and because the molten metal cannot flow smoothly enough through such a region during the die-casting process. On the other hand, in the pickup frame 6 of this preferred embodiment, a synthetic resin supporting base with the main-shaft bearing 6a and a metal die-cast optical base with the sub-shaft bearing 6b and the optical element supporting surface are separately provided. That is why the supporting base just needs to meet the size accuracy that is high enough to form the main-shaft bearing 6a just as intended, while the optical base only needs to determine the relative sizes and positions of the sub-shaft bearing 6b and the optical element supporting surfaces accurately enough. As a result, according to this preferred embodiment, multiple metal die-cast optical bases can be obtained every time the molding process is carried out. For example, at least two bases, or even four bases, can be obtained a time. For that reason, the die should be subjected to the maintenance much less often and much less lightly. Consequently, the cost of the pickup frame can be reduced significantly. As described above, according to the present invention, a thinner and lighter optical pickup device is provided at a reduced cost.

(Embodiment 2)

In the pickup frame 6 of the first preferred embodiment described above, the high-reflecting mirror 14 is supposed to be supported by the supporting base 18. However, the high-reflecting mirror 14 may also be supported by the optical base 19 as in a second specific preferred embodiment of the present invention to be described below.

The optical drive of the second preferred embodiment has the same configuration as the counterpart of the first preferred embodiment except the structure of the pickup frame, and the description thereof will be omitted herein. Also, to describe the principal features of this second preferred embodiment more simply and more understandably, the following description of the pickup frame of the second preferred embodiment will be focused on only the differences from the first preferred embodiment, and the other common features will not be described all over again.

Figure 4:
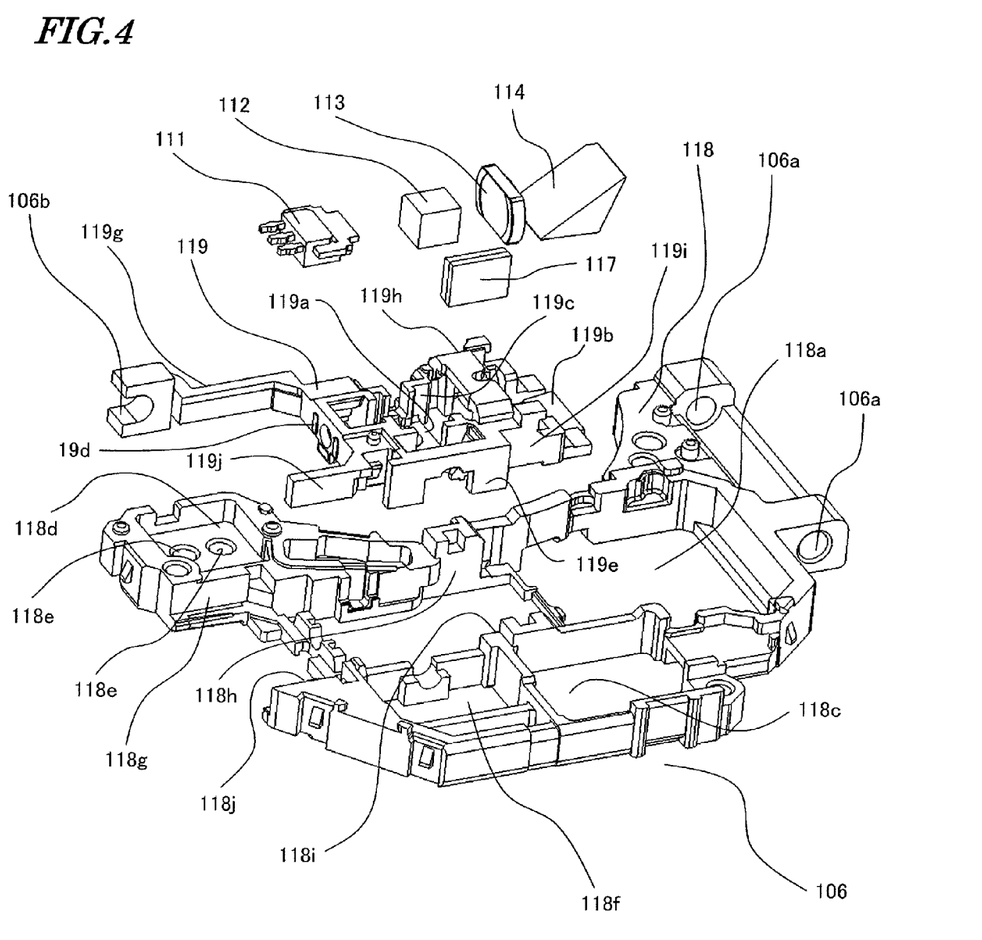
FIG. 4 is a perspective view illustrating the structure of a pickup frame according to a second preferred embodiment of the present invention along with optical elements to be assembled on the frame.

Hereinafter, the configuration of the optical pickup device of the second preferred embodiment will be described. FIG. 4 is a perspective view illustrating a pickup frame 106 along with optical elements to be supported by the pickup frame 106. Unlike the first preferred embodiment described above, the high-reflecting mirror 114 is supported in this preferred embodiment by the optical base 119.

Effects Achieved by Embodiment 2

In this pickup frame 106, the supporting base 118 including the main-shaft bearing 106a with two concentric round holes to pass the main shaft 7 (see FIG. 1) through and an opening 118a to house the objective lens driver 16 (see FIG. 2) inside is formed out of a synthetic resin. The supporting base 118 has bonding surfaces 118g, 118h, 118i and 118j with respect to the optical base 119.

On the other hand, the optical base 119 with a sub-shaft bearing 106b to pass through the sub-shaft 8 (see FIG. 1) with a U-cross section is formed by metal die-casting process. The optical base 119 also has light emitter (111), beam splitter (112), collimator lens (113) and photodetector (117) supporting surfaces 119d, 119a, 119c and 119e and the bonding surfaces 119g, 119h, 119i and 119j with respect to the supporting base 118. The optical base 119 further has a high-reflecting mirror (114) supporting surface 119b.

By forming the pickup frame 106 with the supporting base 118 and the optical base 119 bonded together with an adhesive, the following effect (E) is further achieved by this preferred embodiment:

(E) Even when the optical pickup device 3 (see FIG. 1) with a reduced thickness is exposed to a harsh external environment that has a very high temperature or a very low temperature or that alternates between the very high and very low temperatures a number of times, sufficiently high relative size accuracy can be achieved between the optical elements including the light emitter 111, beam splitter 112, collimator lens 113, high-reflecting mirror 114, and photodetector 117 that are supported on the optical base 119.

By adopting the pickup frame 106 of this preferred embodiment, the light beam spot on the optical disc will not be deformed, the light reflected from the optical disc will not deviate significantly off target on the photodetector 117, the quality of the read/write signal will never deteriorate, and an error signal to control the optical pickup device 3 will not be disturbed, either. Consequently, an optical pickup device 3 that can withstand such a steep change of temperatures of the external environment is realized.

Different effects are achieved by this second preferred embodiment and by the first preferred embodiment described above depending on whether the high-reflecting mirror is supported by the metal die-cast optical base or by the synthetic resin supporting base. Since not only the light emitter, the beam splitter, the collimator lens and the photodetector but also the high-reflecting mirror are supported by the optical base according to this second preferred embodiment, the relative size accuracy can be maintained easily between the optical elements even if the external environment changes its temperatures. Nevertheless, even according to the first preferred embodiment described above, the relative size accuracy between those optical elements can also be maintained no less easily through such a change of temperatures of the external environment than in this second preferred embodiment. This is because in the pickup frame 6 shown in FIG. 3, bonding surfaces 18$h$, 18$i$ on the supporting base and bonding surfaces 19$h$, 19$i$ on the optical base are provided for the optical base 19 on both sides of the high-reflecting mirror supporting surface 18$b$ of the supporting base 18. That is why even when the temperature of the external environment changes significantly, the high-reflecting mirror supporting surface 18$b$ can maintain almost as much stability as the optical base 19. In the first preferred embodiment described above, the high-reflecting mirror supporting surface 18 is provided as an additional support, and therefore, the supporting base 18 can be reinforced according to the angled shape. Consequently, either the first preferred embodiment or the second preferred embodiment may be arbitrary chosen according to the structure or arrangement of those optical elements in the optical pickup device and in view of the structure and mechanical strength of the supporting base and its stability through the injection molding process.

(Embodiment 3)

In a pickup frame 6 as a third specific preferred embodiment of the present invention, the U-shaped sub-shaft bearing 6$b$, which would have low mechanical strength when made of a synthetic resin, is formed by metal die casting process, and the rest of the frame is formed out of a synthetic resin. As described above, if the sub-shaft bearing 6$b$ were formed out of a synthetic resin, the sub-shaft bearing 6$b$ would be broken easily due to the impact caused by accidental drop of the optical pickup device. That is why according to this third preferred embodiment, the sub-shaft bearing 6$b$ is formed by metal die casting process to avoid such damage and the rest of the frame is formed out of a synthetic resin to realize a less expensive pickup frame 6. In such a structure, the synthetic resin portions and the metal die-cast portion can be combined together by bonding the sub-shaft bearing 6$b$ to a beam portion corresponding to the boning surface 19$g$.

Alternatively, considering the heat generated by the light emitter 11, the sub-shaft bearing 6$b$, the beam portion corresponding to the bonding surface 19$g$, and the light emitter supporting surface 19$d$ may be formed by metal die casting process, while the rest of the frame may be formed out of a synthetic resin. In that case, the synthetic resin portions and the metal die-cast portions may be bonded and combined together at and around the light emitter supporting surface 19$d$. If the metal die-cast portions are either in contact with, or located near, the light emitter 11 (or its holder), the heat can be dissipated efficiently.

Figure 5:
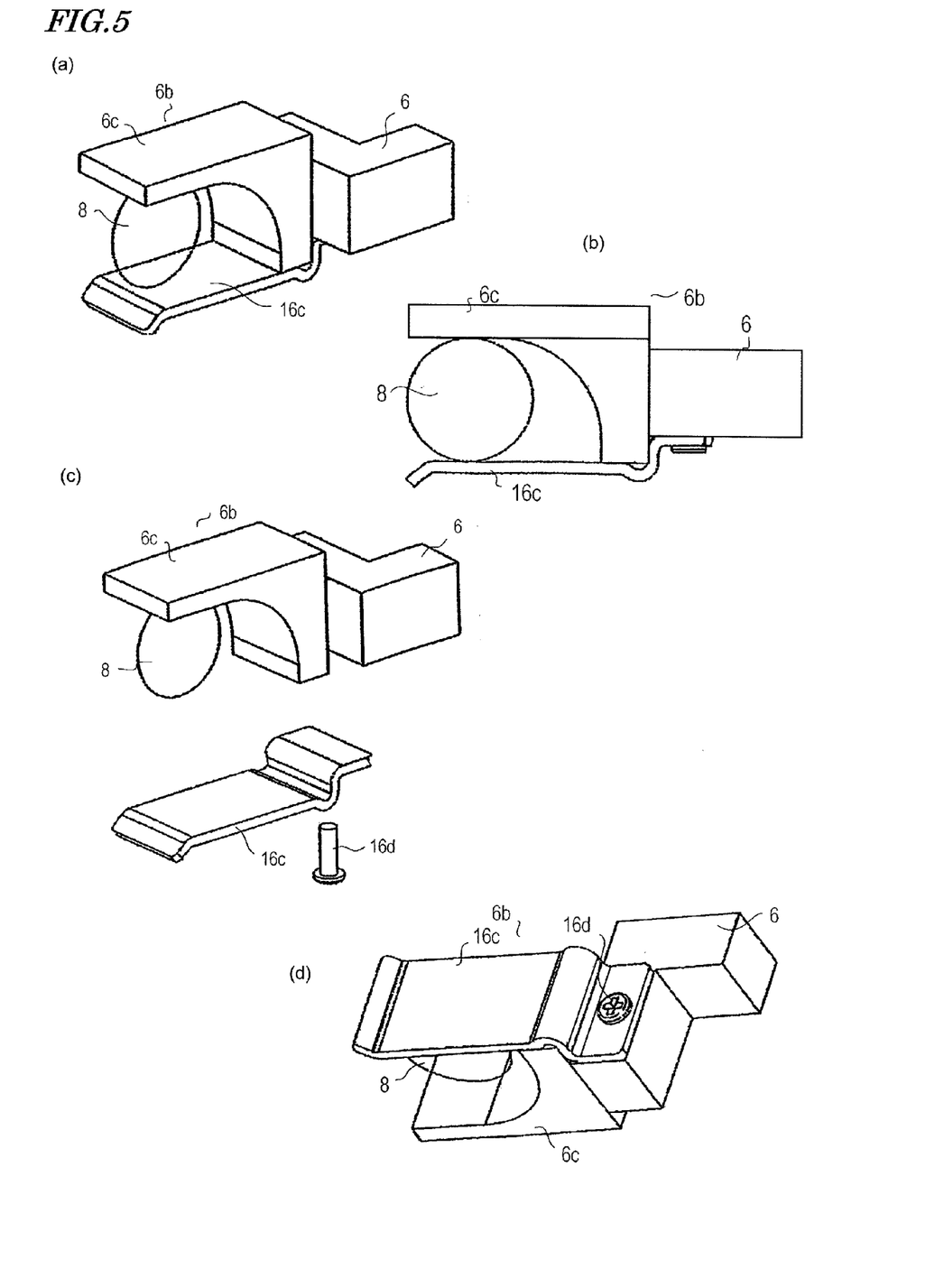
FIG. 5 illustrates the structure of a pickup frame according to a third preferred embodiment of the present invention.

Next, an example in which one of the two bosses 6$c$ of the U-shaped sub-shaft bearing 6 is a metallic one and the other boss is made of a synthetic resin will be described. FIG. 5 illustrates such a sub-shaft bearing 6$b$. Specifically, FIGS. 5($a$) and 5($b$) are respectively a perspective view and a cross-sectional view illustrating such a sub-shaft bearing 6$b$.

The one boss 6$c$ is a synthetic resin one that forms an integral part of the frame 6, while the other boss 16$c$ is a piece of plate metal and is a metallic one. These bosses 6$c$ and 16$c$ function not only as contact portions that grip the sub-shaft 8 (see FIG. 1) vertically but also as a restricting portion that restricts the vertical movement of the frame 6. The plate metal boss 16$c$ is screwed to the frame 6 with a screw 16$d$ as shown in FIGS. 5($c$) and 5($d$).

By using the plate metal boss 16$c$, the thickness of the frame (i.e., the thickness of the optical pickup device) can be reduced and eventually the thickness of the optical drive itself can be reduced, too. Also, by gripping the sub-shaft 8 between the boss 6$c$ and the plate metal boss 16$c$, the gap left between these bosses and the sub-shaft 8 can be eliminated. As a result, the optical pickup device will go just straight, and never rattle, while moving on the shafts.

The present invention provides a pickup frame for an optical pickup device, an optical pickup device including such a frame, and an optical information recording/reproduction apparatus in which a synthetic resin supporting base with a main-shaft bearing and a metal die-cast optical base with a sub-shaft bearing are combined together. As a result, not just can the thickness and the weight of the frame be reduced but also can the deformation or breakdown of the frame be avoided even when the frame is subjected to some external force such as impact caused by accidental drop. On top of that, even when the temperature of the external environment changes dramatically, sufficiently high relative size accuracy can be maintained between the main- and sub-shaft bearings and between the optical elements supported by this pickup frame. Furthermore, the heat generated by the light emitter can also be dissipated efficiently. Compared to a pickup frame that has been formed as a single member only by metal die casting process, the pickup frame of the present invention can achieve the same effects at significantly reduced costs. For that reason, the present invention can be used particularly effectively in the field of optical information recording/reproduction apparatuses such as a mobile PC that should have its thickness and weight reduced as much as possible and that should make its light emitter have as high power as possible (which generates a lot of heat) when information needs to be read from, or written at high rates on, a huge-capacity recording medium loaded in such an apparatus.

What is claimed is:

1. A frame for use in an optical pickup device,
   wherein the frame includes a first base, which has been formed out of a metal, and a second base, which has been formed out of a resin and which is secured to the first base, and
   wherein the frame is arranged between a first shaft portion and a second shaft portion, which runs substantially parallel to the first shaft portion, and is movable parallel to the first shaft portion while being engaged with the first and second shaft portions, and
   wherein the first base includes:
   an optical element supporting portion for supporting optical elements for emitting a laser beam toward an optical recording medium and receiving light that has been reflected from the optical recording medium, and
   a first shaft bearing portion to engage with the first shaft portion, and
   wherein the second base includes a second shaft bearing portion to engage with the second shaft portion.

2. The frame of claim 1, wherein one of the first and second shaft bearing portions has a hole to pass its associated shaft portion through, and wherein the other shaft bearing portion includes a restricting portion for restricting vertical movement of the frame by vertically gripping its associated shaft portion.

3. The frame of claim 1, wherein the first shaft bearing portion includes a restricting portion for restricting vertical movement of the frame by vertically gripping the first shaft portion, and wherein the second shaft bearing portion has a hole to pass the second shaft portion through.

4. The frame of claim 1, wherein the first and second bases are bonded together with an adhesive.

5. The frame of claim 1, wherein the first base includes a mirror supporting portion for supporting a high-reflecting mirror that reflects an emitted laser beam perpendicularly to the surface of the optical recording medium.

6. The frame of claim 1, wherein the second base includes a mirror supporting portion for supporting a high-reflecting mirror that reflects an emitted laser beam perpendicularly to the surface of the optical recording medium.

7. An optical pickup device comprising:
the frame of claim 1,
a light emitter for emitting a laser beam, and
an optical system for guiding the laser beam emitted toward the optical recording medium.

* * * * *